(12) United States Patent
Ueno et al.

(10) Patent No.: US 6,999,281 B2
(45) Date of Patent: Feb. 14, 2006

(54) HEAD SLIDER AND DISK DRIVE APPARATUS

(75) Inventors: Yoshihiro Ueno, Osaka (JP); Zhi Sheng Deng, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/353,022

(22) Filed: Jan. 29, 2003

(65) Prior Publication Data

US 2003/0161072 A1    Aug. 28, 2003

(30) Foreign Application Priority Data

Jan. 30, 2002    (JP)    ............... 2002-021435

(51) Int. Cl.
   *G11B 5/60*    (2006.01)
(52) U.S. Cl. ............... 360/235.6; 360/235.7; 360/235.8; 360/236
(58) Field of Classification Search ............. 360/235.6, 360/236, 235.7, 235.8
   See application file for complete search history.

(56) References Cited

U.S. PATENT DOCUMENTS

| 5,872,685 | A | 2/1999 | Park et al. |
| 6,501,621 | B1 * | 12/2002 | Griffin et al. ............ 360/235.6 |
| 6,587,308 | B2 * | 7/2003 | Sannino et al. .......... 360/236.3 |
| 6,590,746 | B2 * | 7/2003 | Kang et al. ............... 360/236.3 |
| 2001/0030834 | A1 | 10/2001 | Kohira et al. |
| 2002/0135941 | A1 | 9/2002 | Kohira et al. |

FOREIGN PATENT DOCUMENTS

| JP | 2000-57724 | 2/2000 |
| JP | 2001-229518 | 8/2001 |

* cited by examiner

*Primary Examiner*—Robert S. Tupper
(74) *Attorney, Agent, or Firm*—Wenderoth, Lind & Ponack, L.L.P.

(57) ABSTRACT

A Head slider 20 has a substantially rectangular parallelepiped shape and a disk-facing surface adapted to oppose a disk 400, as well as a head 22 disposed on the disk-facing surface for performing record/reproduce operations. The disk-facing surface has a cross rail 261 disposed at a predetermined distance from an upstream edge portion 36 perpendicular to the rotating direction of disk 400, and an upstream-side intermediate-level surface 32 formed to be lower than cross rail 261 and extended from the forward edge of cross rail 261 to upstream edge portion 36. A step depth H at a stepped portion 38 between cross rail 261 and intermediate-level surface 32 is set to be within a range of 5 nm to 100 nm. Thus, a disk drive is provided that is capable of record/reproduce operations while maintaining stable flight of head slider 20 when the relative speed between the head slider and disk is low and that has good shock resistance.

18 Claims, 11 Drawing Sheets

Prior Art

HEAD SLIDER AND DISK DRIVE APPARATUS

FIELD OF THE INVENTION

The present invention relates to a head slider having mounted thereon a head for recording and/or reproducing data on a disk-shaped recording medium, such as a magnetic disk or a magneto-optic disk, and also relates to a disk drive apparatus using such a head slider.

BACKGROUND OF THE INVENTION

Recently, there have been made great technological advances in disk recording/reproducing apparatus (hereinafter referred to as "disk drives") for recording and/or reproducing data on a disk-shaped recording medium such as a hard disk or an optical disk (hereinafter referred to as "disks") and their use is expanding not only in conventional computers but also in many other fields. There are increasing demands for such disk drives to have high recording density and, in addition, to be small in size, consume little power, have good shock resistance, and be mountable onto portable equipment.

Figure 14:
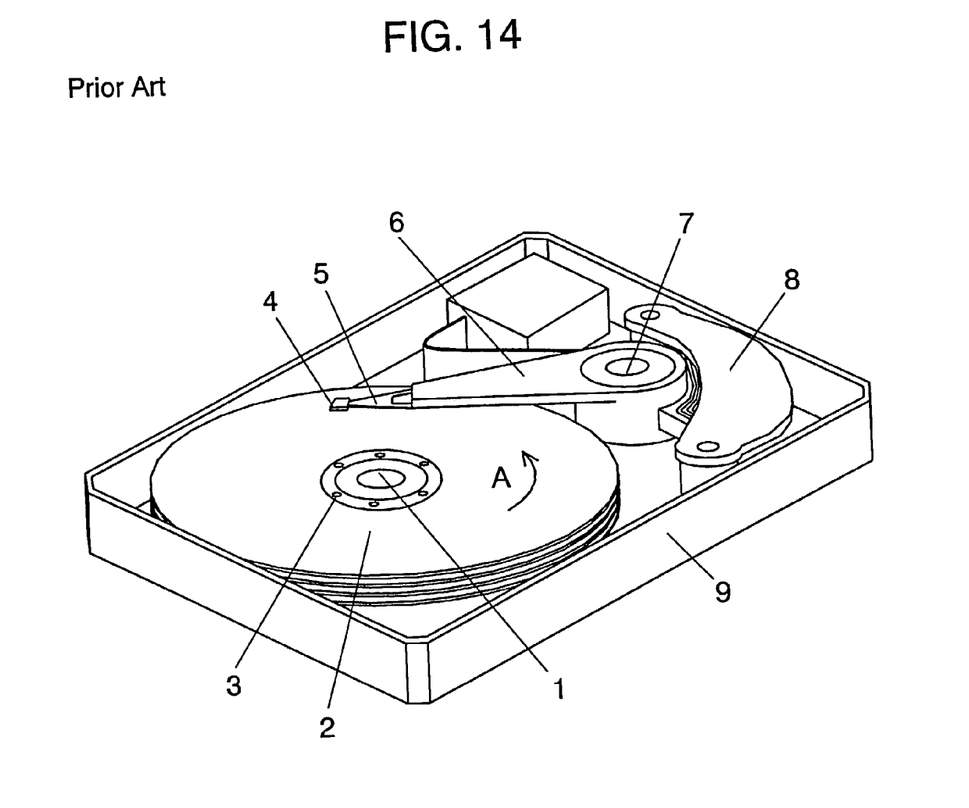
FIG. 14 is a perspective view schematically showing a conventional disk drive.

FIG. 14 is a perspective view schematically showing a disk drive. In FIG. 14, a disk 2 is supported on a main spindle 1 so as to be rotatively driven by a driving means 3. As driving means 3, a spindle motor for example is used. A head slider 4 having a head (not shown) for performing a record/reproduce operation (i.e., for performing a recording and/or a reproducing operation) is supported on a suspension 5 and the suspension 5 is fixed to an actuator arm 6. Actuator arm 6 is attached to actuator shaft 7 for rotation.

A positioning means 8, for example a voice coil motor, allows actuator arm 6 to swing so that head slider 4 is shifted to a predetermined track position of disk 2. A housing 9 serves to keep the above described members in predetermined relative positions and, by being covered with a lid (not shown) serves also to protect the above-mentioned components and other components within the housing.

While a record/reproduce operation is performed in the disk drive having the described structure, the following three forces are applied to the head slider 4 and a balance among these three forces allows head slider 4 to fly while maintaining a designed flying height. The first of the forces is the load exerted by suspension 5 such that head slider 4 is urged in the direction of the disk. The second is a force resulting from a flow of viscous fluid such as air accompanying the rotation of the disk and this is a positive pressure acting to urge the head slider 4 to fly above disk 2. The third is a force similarly resulting from a flow of viscous fluid such as air accompanying the rotation of the disk but this is a negative pressure acting to urge the head slider 4 toward the disk 2. While head slider 4 is flying at a predetermined flying height by virtue of the balance among the three forces, positioning means 8 is driven so that head slider 4 is shifted to a predetermined track position and a record/reproduce operation is performed by the head (not shown).

With the increase in the recording capacity per unit area of disks, disk drives of smaller size and smaller thickness have come to be realized and mounted on portable equipment such as notebook-size personal computers. For example, disks have become as small as 3.5 in., 2.5 in., or as small as 1.3 in., in diameter. As the disk diameter is decreased, the number of revolutions of the disk 2 is accordingly increased. Thus, the rotation speeds of these smaller diameter disks are increased to 4500 rpm, 5400 rpm, and 7200 rpm, respectively. Thus, when the diameter of disk 2 is decreased, it has conventionally been required to increase the number of revolutions of disk 2 in order to maintain the relative speed between disk 2 and head slider 4 at required levels.

In order to realize a still smaller disk drive and to have it mounted on portable equipment represented by mobile telephones, there also arises a very important problem of reducing the power consumption. More specifically, though smaller diameter disks are required in order for disk drives to be mounted on portable equipment, it is a problem to increase the number of revolutions because doing so incurs an increase in power consumption. Also, it is required to maintain a stable flying height of the disk even if the relative speed between the head slider and the disk becomes low when such a smaller sized disk is used. It is further required, even when external shock is exerted on the head slider, that wear and tear or damage to the head slider or the disk due to collision or contact of the head slider with the disk be prevented.

A structure of a head slider capable of flying above the disk surface even if the relative speed between the head slider and the disk is low is disclosed in Japanese Patent Unexamined Publication No. 2001-229518. In the disclosed head slider, there are formed grooves of different depths in the surface of the head slider opposite the disk, whereby stepped portions having at least two steps are formed, and the depth of the shallowest groove of the grooves forming such stepped portions is set to 250 nm or below. It is stated therein that a stable flying height can be maintained by the use of this head slider even if the relative speed between the head slider and the disk is low.

Although it is stated in the disclosure cited that the head slider is kept at a stable flying state so as not to cause a collision with the disk when the relative speed is low, it is not stated that the head slider, while flying with a low relative speed, is prevented from causing damage on the head slider or the disk when the head slider is subjected to a shock force.

SUMMARY OF THE INVENTION

It is an object of the present invention to provide a head slider structure capable of maintaining a stable flying height above a disk surface even if the relative speed between the head slider and the disk is lowered and hardly avoiding significant damage to the head slider or the disk even if the head slider is subjected to an external shock, and also to provide a disk drive using such a head slider.

The head slider of the present invention has a structure as described below; namely, the head slider is formed substantially in a rectangular parallelepiped shape having an upstream edge portion on a forward end side and a downstream edge portion on a rearward end side, with respect to a disk rotation direction, and the head slider comprises:

a disk-facing surface of the head slider (i.e. a surface of the head slider to be disposed opposite to (or facing) the disk); and a head disposed on the disk-facing surface for performing at least one of recording and reproduction, wherein the disk-facing surface includes:

a cross rail disposed at a predetermined distance from the upstream edge portion perpendicular to the rotating direction of the disk; and an upstream-side intermediate-level portion (surface) formed to be lower than the cross rail, and in which the step depth at the stepped portion between the cross rail and the upstream-side intermediate-level portion is set to be within a range of 5 nm to 100 nm.

By virtue of such a structure, the head slider is able to maintain a flying height at a substantially satisfactory level even when the disk rotates at a low speed and the relative speed between the head slider and the disk is lowered. Also, such an advantageous effect can be obtained that variations of the flying height can be suppressed even if the head slider is subjected to changes in the relative speed or changes in the atmospheric pressure. Further, the head slider can be provided with good shock resistance such that the head slider and the disk are hardly damaged even when the head slider is subjected to an external shock force. Accordingly, a disk drive is provided which is small, thin, and consumes little power and is thus mountable on portable equipment.

DETAILED DESCRIPTION OF THE EXEMPLARY EMBODIMENTS

Exemplary embodiments of the present invention will be described with reference to the accompanying drawings.

(First Exemplary Embodiment)

Figure 1A:
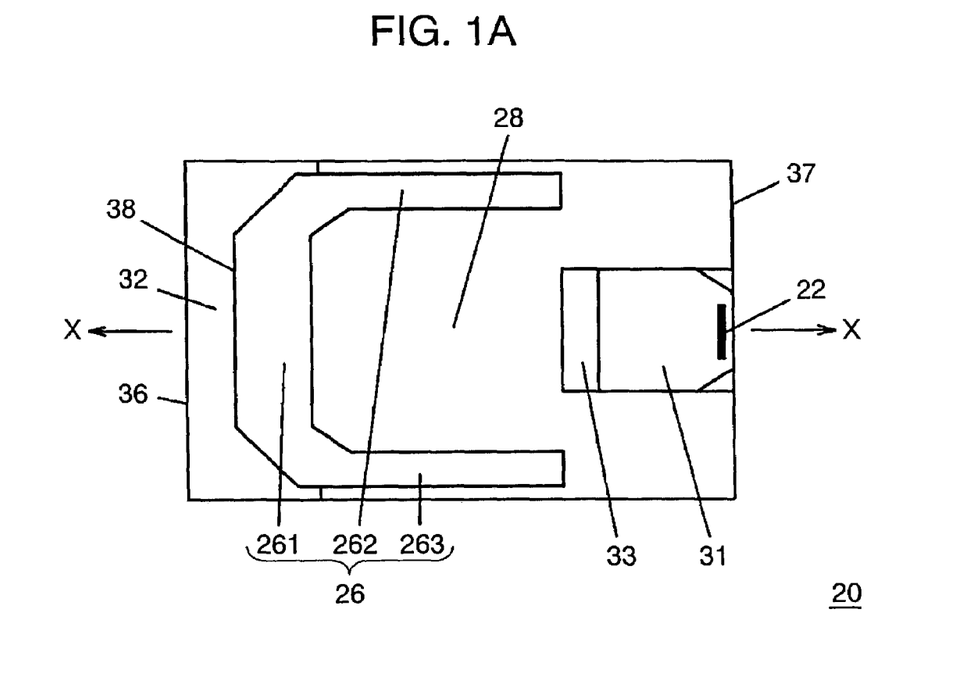
FIG. 1A is a plan view showing a disk-facing surface of a head slider according to a first embodiment of the invention.
Figure 1B:
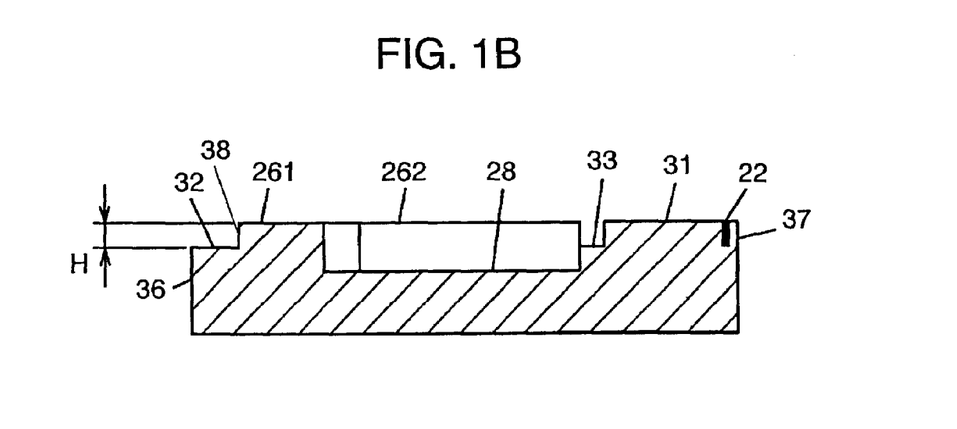
FIG. 1B is a sectional view of the head slider of the first embodiment.

FIG. 1A is a plan view of a head slider 20 of a first embodiment of the present invention showing its disk-facing surface, and FIG. 1B is a sectional view taken along the line X—X of FIG. 1A. Head slider 20 is formed in a substantially rectangular parallelepiped shape, which has an upstream edge portion 36 on a forward side and a downstream edge portion 37 on a rearward side, with respect to the rotating direction of a disk. In the present embodiment, the disk-facing surface is configured to have a first positive-pressure generating section 26, a second positive-pressure generating section 31, a negative pressure generating section 28, an upstream-side intermediate-level portion (surface) 32, a downstream-side intermediate-level portion 33, and a head 22 disposed on the second positive-pressure generating section 31.

The configuration will be described below in more detail. At a position a predetermined distance apart from upstream edge portion 36, a cross rail 261 is arranged perpendicular to the rotating direction of the disk. Connected with cross rail 261 at both of its ends and extended toward downstream edge portion 37, there are disposed side rails 262 and 263, which, together with cross rail 261, constitute first positive-pressure generating section 26. Along the center line with respect to the lateral direction, there is disposed second positive-pressure generating section 31, which is elevated from the level of downstream edge portion 37. Extended a predetermined distance toward upstream edge portion 36 from the forward edge of second positive-pressure generating section 31, there is disposed downstream-side intermediate-level portion 33. Further, extended in the direction of upstream edge portion 36 from a stepped portion 38 formed on the forward end side of cross rail 261, there is disposed upstream-side intermediate-level portion 32. The area surrounded by first positive-pressure generating section 26 and second positive-pressure generating section 31, plus downstream-side intermediate-level portion 33, constitutes negative pressure generating section 28 which is recessed most deeply from the disk surface. With the described configuration of the disk-facing surface, a step depth H at the stepped portion 38 between upstream-side intermediate-level portion 32 and cross rail 261 is set to be within a range of 5 nm to 100 nm, which is a characteristic of the present invention.

Negative pressure generating section 28 is constituted of a deep recess largely surrounded by first positive-pressure generating section 26 and downstream-side intermediate-level portion 33. A viscous fluid flowing into the deep recess from the side of cross rail 261 abruptly expands so as to generate a negative pressure at the negative pressure generating section 28. This negative pressure acts to urge head slider 20 toward the disk.

When a head slider of a general, conventional configuration is steadily lifted above the disk surface, the head slider maintains its flying attitude at a pitch angle of 0.1 mrad or so. When such a head slider is subjected to a shock force in the direction of the disk and the head slider is thereby caused to come close to the disk surface, then the positive pressure generated around the upstream edge portion is generally lower than the positive pressure generated around the downstream edge portion. Hence, it sometimes occurs that the head slider takes a negative pitch angle and the flying attitude becomes unstable. However, in head slider 20 of the present invention a positive pressure is also generated at upstream-side intermediate-level portion 32 when the head slider comes close to the disk surface. Therefore, the overall positive pressure around upstream edge portion 36 is increased so that a positive pitch angle is maintained and, consequently, the slider is prevented from colliding with the disk surface, or, even if it collides with the surface, the shock force is absorbed and the impact minimized.

Head sliders 20 having the described shape can be produced by molding or general-purpose machining but are preferably produced by wet or dry etching. Further, when more precise and complicated working is required, processing by laser beam irradiation or ion irradiation may be used.

In the present embodiment, a processing method using ion irradiation is employed. First positive-pressure generating section 26 and second positive-pressure generating section 31 are made flush with each other and, also, upstream-side intermediate-level portion 32 and downstream-side intermediate-level portion 33 are made flush with each other. On the other hand, the step depth between first positive-pressure generating section 26 and negative pressure generating section 28, as well as between second positive-pressure generating section 31 and negative pressure generating section 28, is set to 0.6 $\mu$m. As to the entire shape of head slider 20, the length, width, and thickness are set to 1.235 mm, 1.00 mm, and 0.3 mm, respectively.

Figure 2:
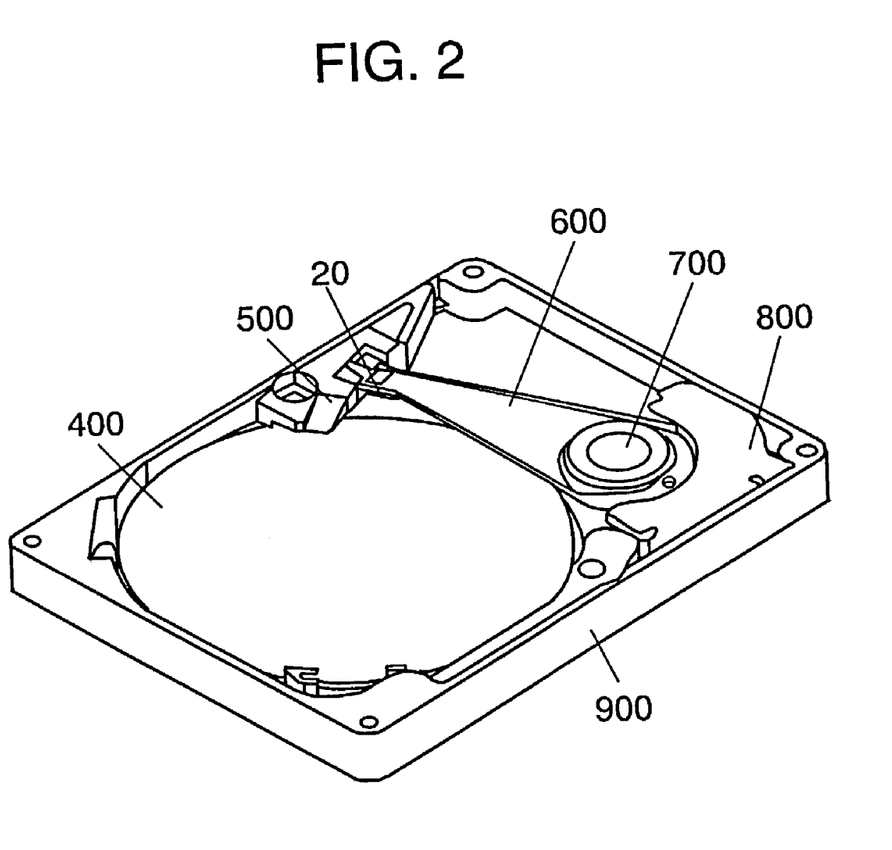
FIG. 2 is a perspective view schematically showing a disk drive using the head slider of the first embodiment.

FIG. 2 is a perspective view schematically showing a disk drive using head slider 20 of the present embodiment. A disk 400 is rotatively driven by a driving means disposed below disk 400. As the driving means, a microminiature spindle motor for example is used. Head slider 20 having a record/reproduce head (not shown) is supported on a suspension (not shown) and this suspension is fixed to an actuator arm 600. Actuator 600, in turn, is attached to an actuator axis 700 for rotation. A positioning means 800, provided for example by a microminiature voice coil motor, allows actuator arm 600 to swing so that head slider 20 is shifted to a predetermined track position of disk 400. A housing 900 retains the above mentioned components in predetermined relative positions and is adapted to be covered with a lid (not shown) for protecting these and other components within the housing. In the disk drive of the present invention, disk 400 is formed integral with the main spindle and, hence, only the disk surface is exposed on the front side of disk 400. Further, there is employed the ramp load system in which the head slider is retracted onto a ramp 500 when the rotation of disk 400 is stopped.

The disk drive as described above is configured substantially the same as the disk drive shown in FIG. 14. However, the diameter of disk 400 is further reduced and the relative speed between disk 400 and head slider 20 is made smaller. More specifically, disk 400 has a diameter of approximately 20 mm and its region from 3 mm to 9 mm of its radius is the recordable region. Further, the skew angle at a radial position of 3 mm at the inner peripheral portion of the disk is set to −3 degrees, the skew angle at a radial position of 9 mm at the outer peripheral portion of the disk is set to +15 degrees, and the number of revolutions of disk 400 is set to 3000 rpm.

By using this disk drive, step depth H at stepped portion 38 of head slider 20 is changed, and flying heights, variations of the flying height, and variations of shock resistance due to the change were obtained by numerical analysis. Since a small diameter disk was used and it was rotated at a small number of revolutions as described above, the relative speed between head slider 20 and disk 400 was approximately 5 m/sec, which is approximately ½ to ⅕ the speed of conventional disk drives.

Figure 3:
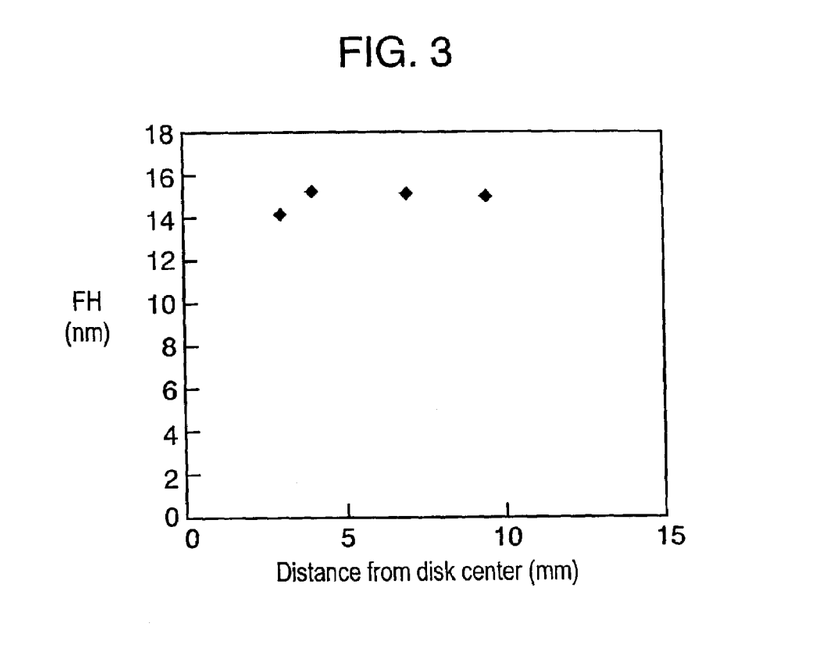
FIG. 3 is a graph showing a relationship between flying height of the head slider and distance from a center of a disk when the head slider of the first embodiment is used.

FIG. 3 shows analytical results of the relation between the distance from the center of disk 400 and the flying height at each position when a head slider 20 having a step depth H at stepped portion 38 of 100 nm was used. As shown in FIG. 3, it was found that substantially constant flying heights can be obtained regardless of the radial position of disk 400.

Figure 4:
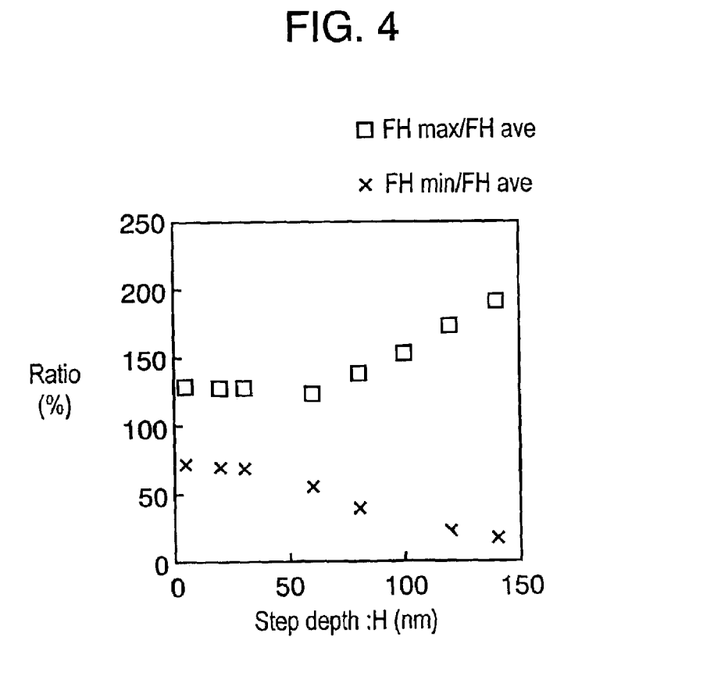
FIG. 4 is a graph showing a relationship between variation of flying height and step depth at the stepped portion of the head slider of the first embodiment.

Then, the flying height varying with changes in step depth H at stepped portion 38 of head sliders 20 was similarly obtained by numerical analysis. The results are shown in FIG. 4. In FIG. 4, the horizontal axis represents step depth H at stepped portion 38. Assessments were made by ratios FHmax/FHave and FHmin/FHave, which ratios are indicated in percentages along the vertical axis, where FHave is the average value of flying heights, while FHmax and FHmin are the maximum value and the minimum value of the flying heights, in the range from the inner peripheral portion of disk 400 at a radial position of 3 mm to the outer peripheral portion at a radial position of 9 mm. From the results, it is found that FHmax/FHave becomes larger as step depth H is increased and FHmin/FHave, conversely, becomes smaller as step depth H is increased. In other words, it is found that greater variations of flying heights occur over the range from the inner peripheral portion to the outer peripheral portion as step depth H at stepped portion 38 is increased. This is greatly affected by the fact that the relative speed between disk 400 and head slider 20 is low. When there are variations in the flying height, recorded/reproduced signals by head slider 20 fluctuate and stable record/reproduce operation becomes impossible. In order that stable record/reproduce operation is performed, it was found necessary that step depth H be 100 nm or below. Further, it was found that, if step depth H is reduced to 60 nm or below, ratios FHmax/FHave and FHmin/FHave were substantially constant even if step depth H was varied. Accordingly, it has been known that variations of the flying height hardly occur even if there are present some variations in working accuracy of step depth H, and hence favorable results such as an improvement of yields can be obtained.

Figure 5:
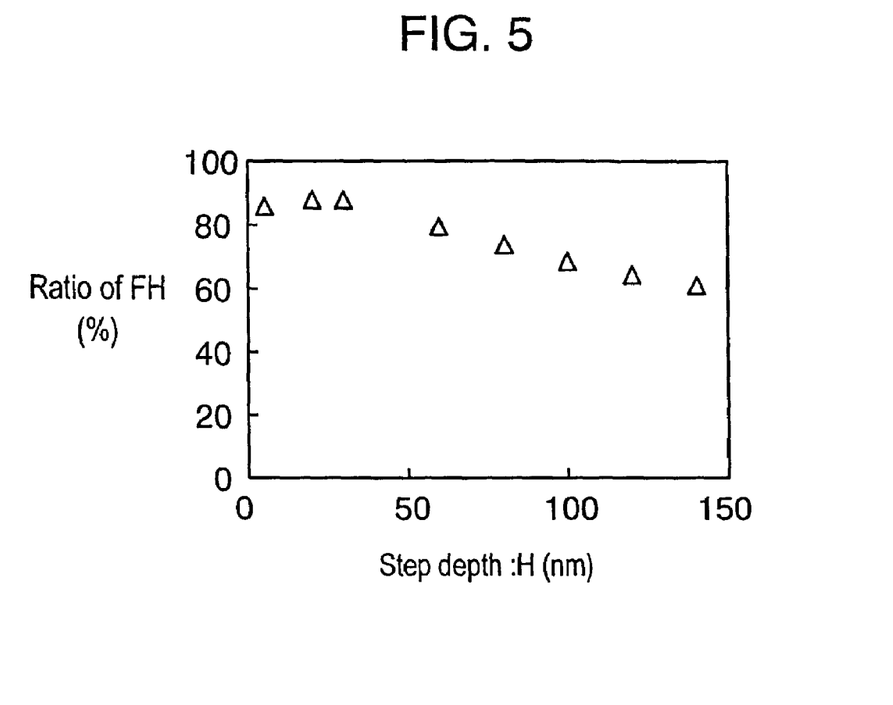
FIG. 5 is a graph showing a relationship between a ratio of flying height when the atmospheric pressure is lowered 20% and step depth at the stepped portion of the head slider of the first embodiment.

Further, the effect of changes in the atmospheric pressure under which the disk drive is used was obtained similarly by numerical analysis. The results are shown in FIG. 5. FIG. 5 shows the ratio, in percentages, between the flying height when the ambient atmospheric pressure was changed by 20% and the flying height prior to the change in the atmospheric pressure. As seen from FIG. 5, it is found that ratios of the flying heights not less than 70% can be obtained when step depth H at stepped portion 38 is set to 100 nm or below. When the step depth is set to 60 nm or below, it is found that ratios of the flying heights not less than 80% can be secured and hence more stable record/reproduce operation can then be performed.

Figure 6:
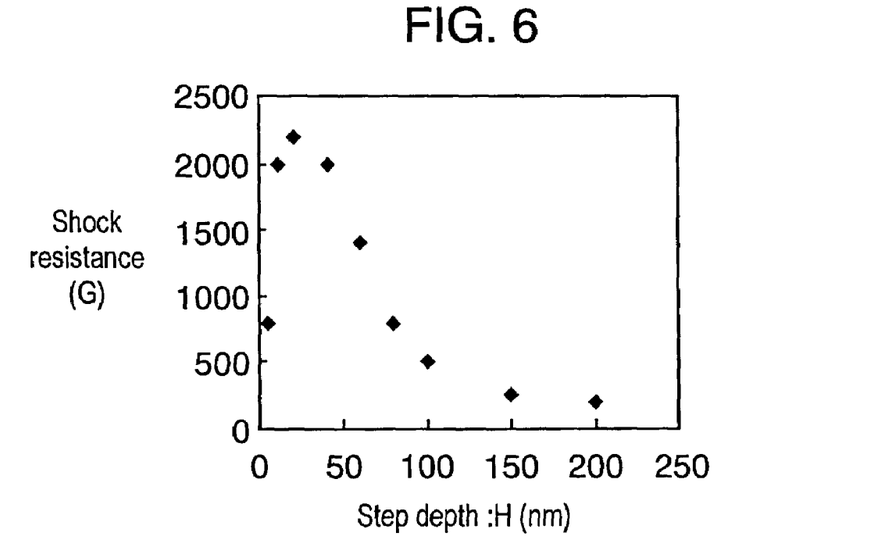
FIG. 6 is a graph showing a relationship between shock resistance and step depth at the stepped portion of the head slider of the first embodiment.

FIG. 6 shows the relationship between step depth H at stepped portion 38 and shock resistance. With respect to shock resistance, numerical analysis was made on the assumption that the equivalent mass of the head slider including the suspension is 8 mg and a shock force produced by a triangular wave of 2 ms is applied to the head slider and, then, an assessment was made by taking the value at the time when the disk comes into contact with head slider upon application of the shock force thereto as the shock resistance. As seen from FIG. 6, it is found that it is possible to increase the shock resistance to 500 G or above if step depth H is set to 100 nm or below. It is further found that it is possible to obtain a shock resistance value of 1400 G or above if step depth H is set to be within a range of 10 nm to 60 nm and therefore a highly reliable disk drive when mounted on portable equipment can be realized.

Although it is not shown in the graph, it was made clear by experiments that the flying attitude becomes very unstable when step depth H is set to 0 nm because it becomes difficult, then, for the viscous fluid to be stably introduced into the space between the disk-facing surface and the disk. Therefore, it is necessary to provide, at least, a nonzero step depth H at stepped portion 38 and, in order to stabilize the flying attitude, it is required to provide a step depth H of 5 nm or above.

In view of the results of analyses as described above, step depth H of 100 nm or below, or, preferably, 60 nm or below, is required in order that variations of the flying height are suppressed and stable record/reproduce operation is performed under the condition of low speeds within a range of 0.5 m/s to 5 m/s. Further, in order to improve the shock resistance, provision of step depth H within a range of 5 nm to 100 nm or, preferably, within a range of 10 nm to 60 nm, is desirable. From these results, step depth H at stepped portion 38 within a range of 5 nm to 100 nm is desired to be provided when importance is placed on the stability of the flying attitude. When further shock resistance is taken into consideration, it is found that the step depth within a range of 10 nm to 60 nm is preferable.

In the present invention, when a shock force is applied to the head slider in the direction to pull the head slider away from disk 400 abruptly, a negative pressure in the direction to attract head slider 20 toward disk 400 is generated at stepped portion 38. Owing to this negative pressure, the head slider 20 is prevented from taking a large pitch angle in a positive direction thereby becoming unstable in its flying attitude. Thus, more stable flying can be performed.

Figure 7A:
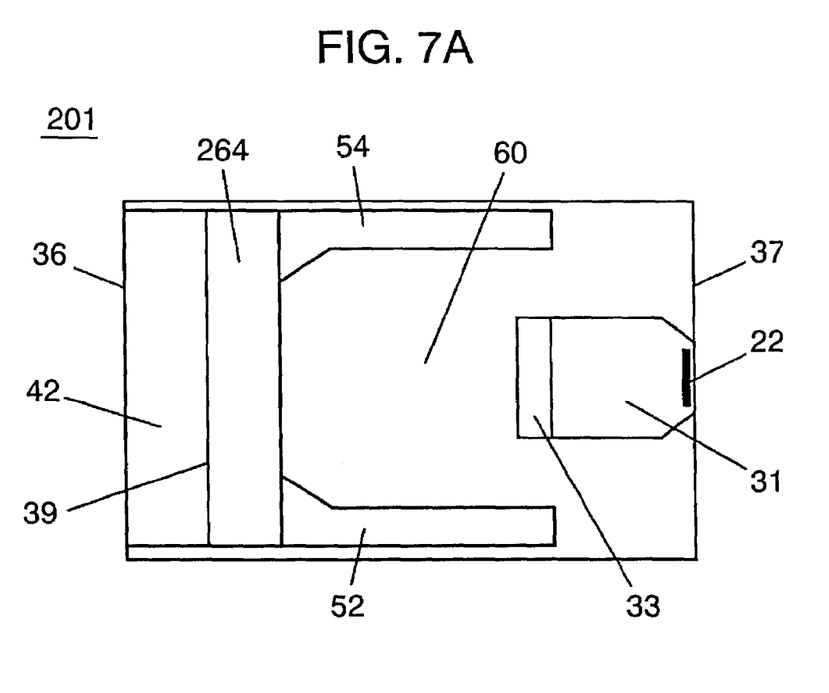
FIG. 7A is a plan view showing a modification of the head slider of the first embodiment.
Figure 7B:
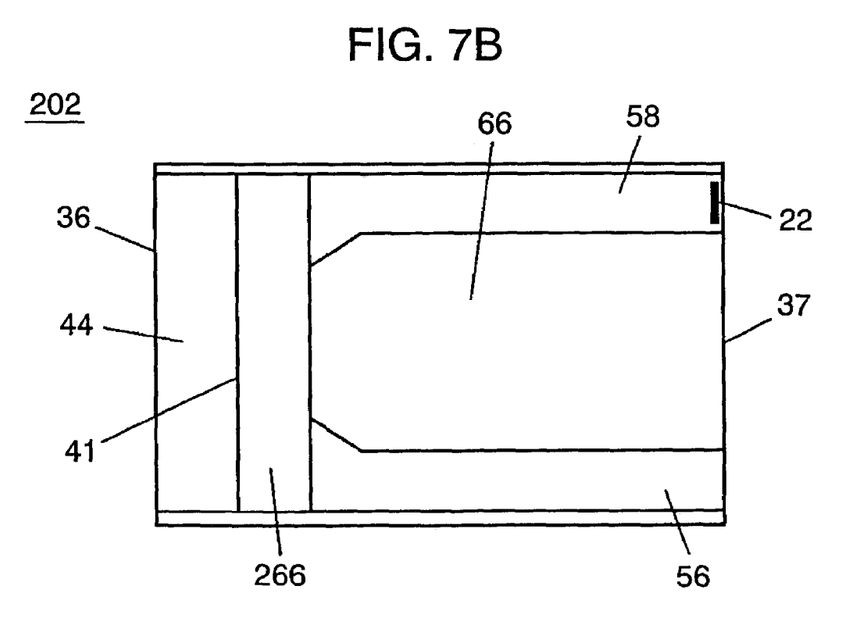
FIG. 7B is a plan view showing another modification of the head slider of the first embodiment.

In head slider 20 of the present embodiment, cross rail 261 and side rails 262, 263 connected with cross rail 261 are made flush with each other to form first positive-pressure generating section 26. The present invention is not limited to such a configuration. Various configurations can be made so long as they lie within the spirit of the present invention. For example, head slider 201, 202 configured as shown in FIG. 7A or FIG. 7B may be used. Like reference numbers are used in denoting components corresponding to those in FIG. 1A and FIG. 1B. In head slider 201 shown in FIG. 7A, a cross rail 264 is not flush with side rails 52, 54, but rather, side rails 52, 54 are formed to be lower than cross rail 264. The area largely surrounded by side rails 52, 54 and cross rail 264 and having the deepest recess constitutes a negative pressure generating section 60. Further, an upstream-side intermediate-level portion 42 is extended from the edge on the forward side of the cross rail in the direction of upstream edge portion 36 and the step depth at a stepped portion 39 is set to 100 nm, whereby functions the same as in the head slider of the present embodiment can be performed.

Further, head slider 202 configured as shown in FIG. 7B may also be used. This head slider 202 has side rails 56, 58 extended down to the downstream edge portion 37 and has head 22 mounted on one of the side rails (side rail 58 in the case shown). An upstream-side intermediate-level portion 44 is extended from the forward edge of a cross rail 266 toward the direction of upstream edge portion 36. The deeply recessed region surrounded by cross rail 266 and side rails 56, 58 is a negative pressure generating section 66. In the described configuration, the step depth at a stepped portion 41 is set to 100 nm or below.

The head slider of the present invention is particularly effectively operated within a range of 0.5 m/s to 5 m/s of the relative speed between the head slider and the disk and such an advantage can be obtained that the variation of the flying height is suppressed even if the relative speed is changed or the atmospheric pressure is changed. The reason for it is as follows. Namely, since the step depth between the cross rail and the upstream-side intermediate-level portion is set to be below 100 nm and above 5 nm, when the relative speed is reduced and the head slider comes close to the disk surface, the upstream-side intermediate-level portion also comes close to the disk surface so as to generate a positive pressure. Since this positive pressure is added to the positive pressure generated by the cross rail, the head slider is returned to the position where it maintains a stable flying height. When the relative speed becomes higher, the flying height also becomes higher, and hence the positive pressure generated at the upstream-side intermediate-level portion becomes lower. Therefore, the head slider flies at a flying height depending on the positive pressure generated at the cross rail. Thus, a head slider can be provided that easily maintains a constant flying height even if the relative speed decreases and exhibits small variations of the flying height even if the relative speed varies.

(Second Exemplary Embodiment)

Figure 8A:
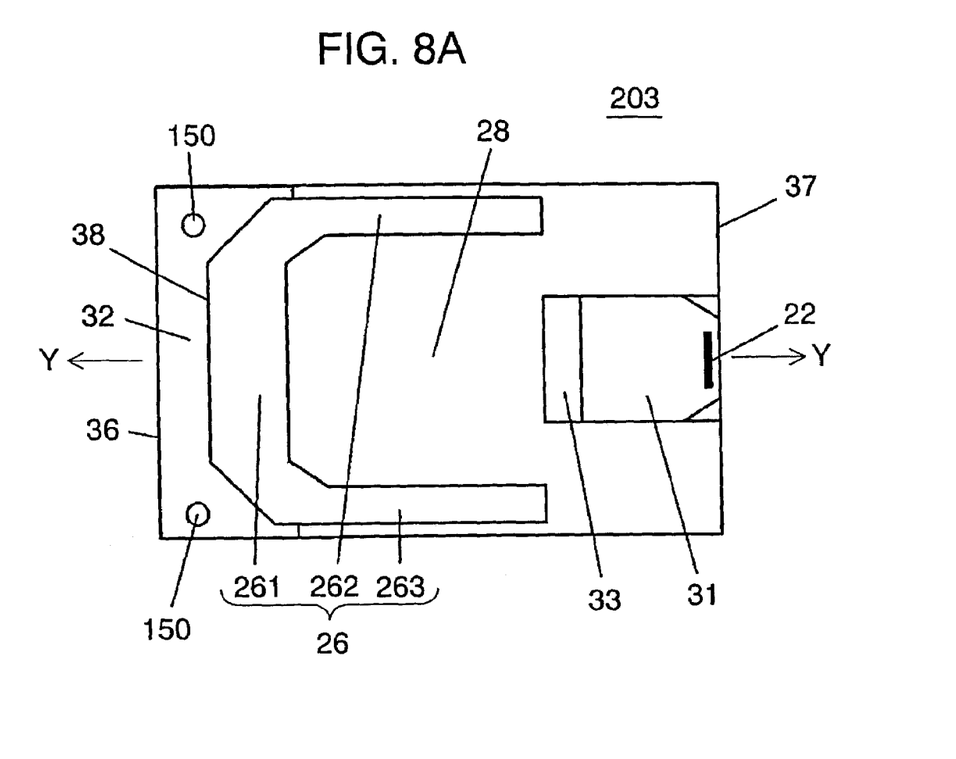
FIG. 8A is a plan view showing a disk-facing surface of a head slider according to a second embodiment of the invention.
Figure 8B:
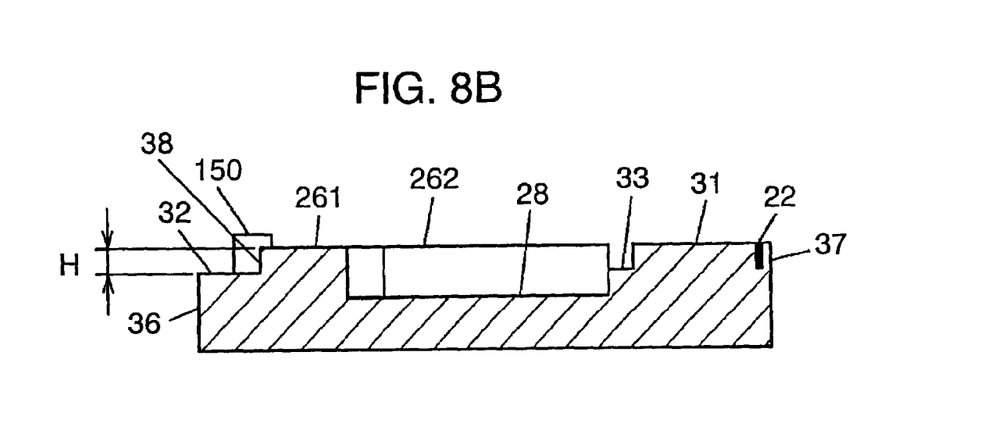
FIG. 8B is a sectional view of the head slider of the second embodiment.

FIG. 8A is a plan view of a head slider 203 of a second embodiment of the invention showing its disk-facing surface, and FIG. 8B is a sectional view taken along the line Y—Y of FIG. 8A. Components corresponding to those shown in FIG. 1A and FIG. 1B are denoted by like reference numerals. In the present embodiment, there is provided a projected portion 150 on the upstream-side intermediate-level portion (surface) 32. Projected portion 150 is formed to be higher than upstream-side intermediate-level portion 32. Cross rail 261 is formed to be lower than projected portion 150 and higher than upstream-side intermediate-level portion 32. Step depth H at stepped portion 38 between cross rail 261 and upstream-side intermediate-level portion 32 is 100 nm or below and, hence, the level difference between upstream-side intermediate-level portion 32 and projected portion 150 is set to be above 100 nm, e.g., it is set to 120 nm. Features other than those described above are the same as those in head slider 20 of the first embodiment and hence description thereof will be omitted.

Head slider 203 can be used by being attached to the disk drive shown in FIG. 2. Head slider 203 not only performs the functions performed by the head slider described in the first embodiment, but also performs the following function. Namely, when a shock force is applied to the disk drive and head slider 203 is brought close to the disk, a positive pressure is generated also on upstream-side intermediate-level portion 32 because step depth H between cross rail 261 and upstream-side intermediate-level portion 32 is set to 100 nm or below. By this positive pressure, collision of head slider 203 with the disk is prevented and, even if a collision occurs, the shock force is absorbed and the impact minimized. This meritorious effect is the same as obtained in head slider 20 of the first embodiment. Head slider 203 of the present embodiment is provided with projected portion 150 and this projected portion 150 is formed to be at the highest level. Therefore, when head slider 203 comes into contact with the disk surface, projected portion 150 first touches the disk surface. Even if projected portion 150 touches the disk surface, it hardly causes damage on the disk surface and, further, adhesion of head slider 203 to the disk surface can be prevented because the projected portion has a small and smooth contacting surface. Accordingly, relief of shock force by virtue of the positive pressure generated at upstream-side intermediate-level portion 32 and prevention of damage on the disk, as well as adhesion of head slider 203 to the disk surface, by virtue of projected portion 150 can both be attained. Thus, a head slider and a disk drive that provide a stable flying height when the relative speed is reduced and that have excellent shock resistance can be realized.

Figure 9:
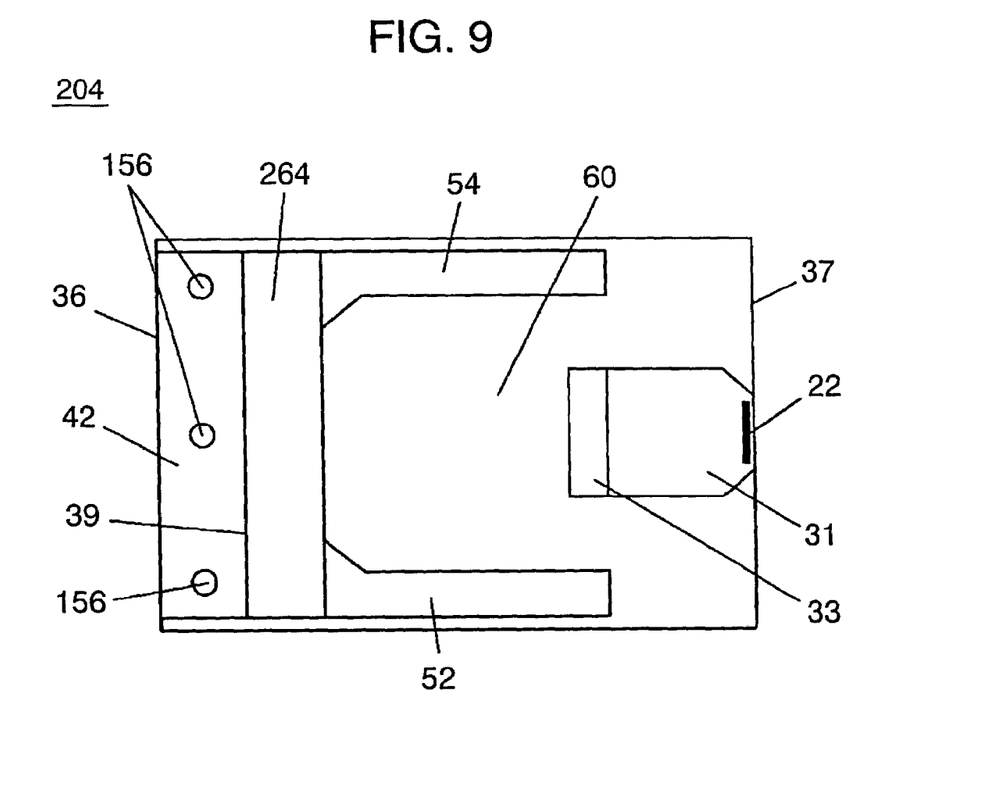
FIG. 9 is a plan view showing a modification of the head slider of the second embodiment.

In head slider 203 of the second embodiment, cross rail 261 and side rails 262, 263 joined thereto are flush with each other. The invention is not limited to such a configuration. A head slider 204 may be configured as shown in FIG. 9. Components corresponding to those in FIG. 7A are denoted by like reference numerals. In the case of head slider 204, if step depth H between a cross rail 264 and an upstream-side intermediate-level portion 42 is set for example to 60 nm and, further, if a plurality of projected portions 156 are provided on upstream-side intermediate-level portion 42 and the level difference between projected portions 156 and upstream-side intermediate-level portion 42 is set to 100 nm, functions and meritorious effects the same as obtained with head slider 203 of the second embodiment can be obtained.

(Third Exemplary Embodiment)

Figure 10A:
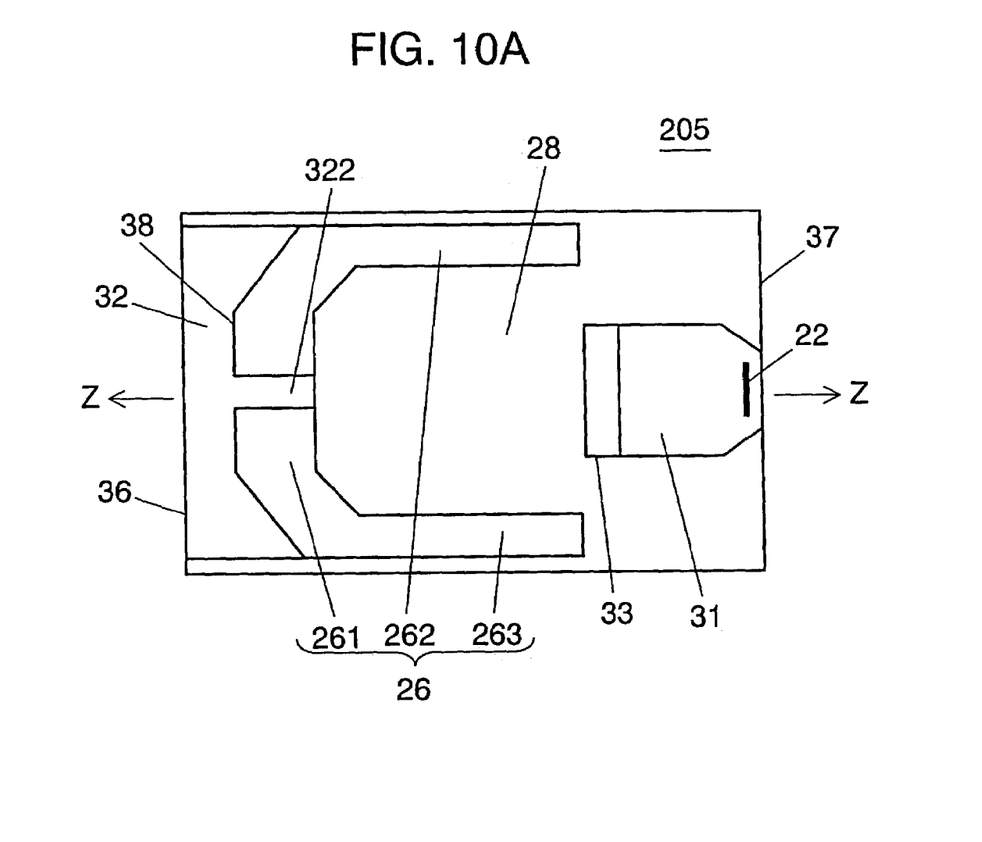
FIG. 10A is a plan view showing the disk-facing surface of a head slider according to a third embodiment of the invention.
Figure 10B:
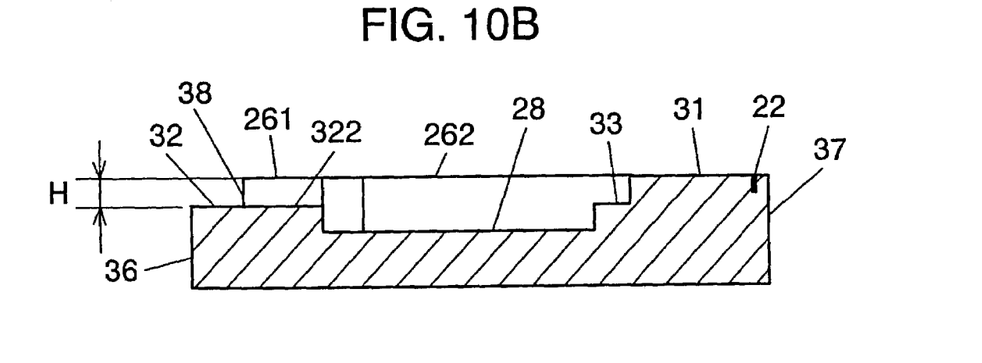
FIG. 10B is a sectional view of the head slider of the third embodiment.

FIG. 10A is a plan view of a head slider 205 of a third embodiment of the invention showing its disk-facing surface, and FIG. 10B is a sectional view of the head slider taken along the line Z—Z of FIG. 10A. Components corresponding to those in FIG. 1A and FIG. 1B are denoted by like reference numerals. Head slider 205 of the present embodiment is different from those of the other embodiments in that there is formed a groove 322 in the center along the lateral direction of a cross rail 261 and this groove 322 is joined with upstream-side intermediate-level portion (surface) 32 and is flush with the same. Stability of the flying height and the shock resistance of head slider 205 of the present embodiment when it is attached to the disk drive shown in FIG. 2 are obtained by numerical analysis. Conditions for the analysis are the same as those in the case of the first embodiment and hence explanation thereof will be omitted. By the provision of groove 322, inflow of the viscous fluid into the space between disk 400 and the disk-facing surface of head slider 205 is facilitated so that the air lubrication film can be easily maintained.

Figure 11:
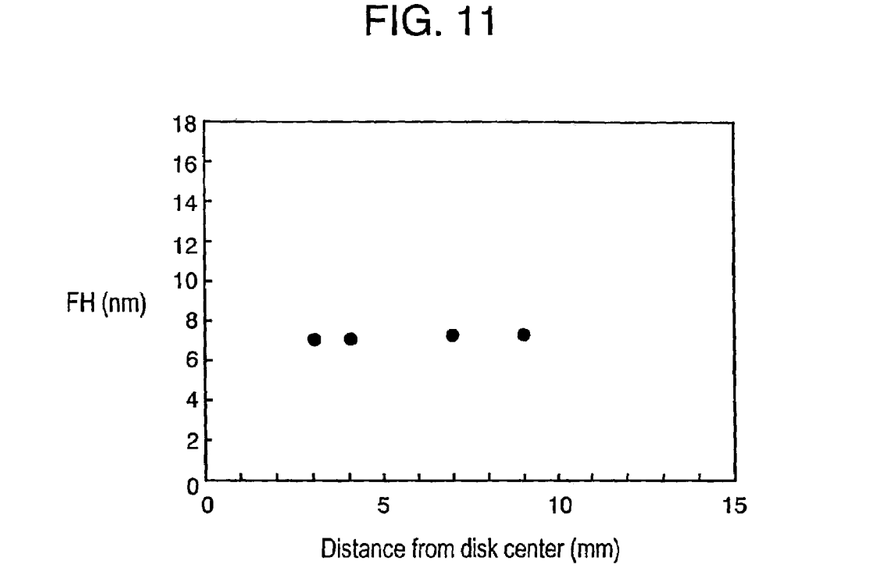
FIG. 11 is a graph showing a relationship between flying height of the head slider and distance from a center of a disk when the head slider of the third embodiment is used.

Results of analysis of the flying height at some distances from the center of disk 400 are shown in FIG. 11. As seen from FIG. 11, it is found that the flying height is substantially constant regardless of the radial positions of disk 400.

Figure 12:
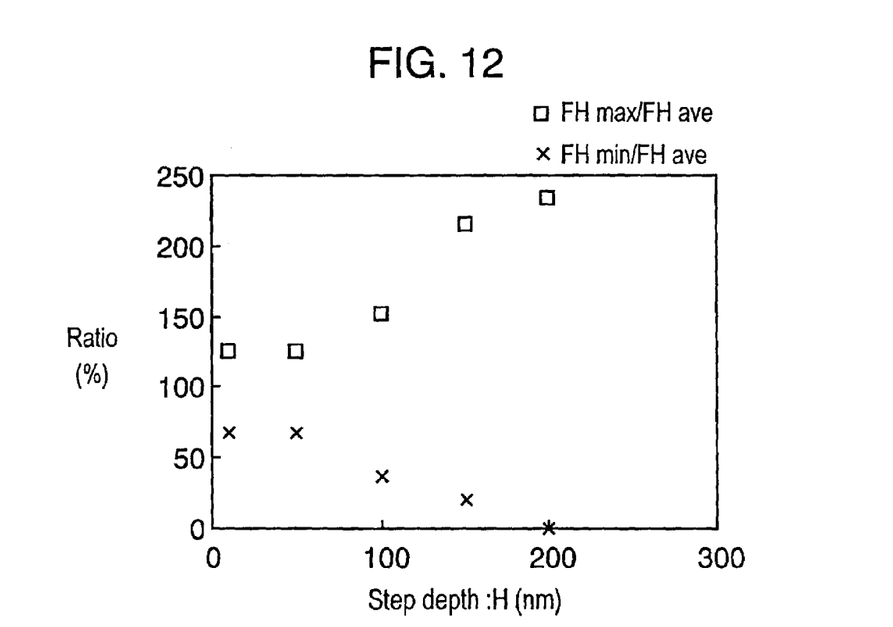
FIG. 12 is a graph showing a relationship between variation of the flying height and step depth at the stepped portion of the head slider of the third embodiment.

Then, variations of the flying height are similarly obtained by numerical analysis for head sliders 205 having various step depths H at stepped portion 38. The results are shown in FIG. 12. The results of FIG. 12 were obtained in the same way as were the results shown in FIG. 4 for the first embodiment. That is, the horizontal axis represents step depth H at stepped portion 38. Assessments have been made by the ratios FHmax/FHave and FHmin/FHave, which ratios are indicated in percentages along the vertical axis, where FHave is the average value of flying heights, while FHmax and FHmin are the maximum value and the minimum value of the flying heights, respectively, in the range from the inner peripheral portion of disk 400 at a radial position of 3 mm to the outer peripheral portion at a radial position of 9 mm.

From the results, it is found that FHmax/FHave becomes larger as step depth H is increased and FHmin/FHave, conversely, becomes smaller as step depth H is increased. In other words, it is found that greater variations of flying heights occur over the range from the inner peripheral portion to the outer peripheral portion as step depth H at stepped portion 38 is increased. When step depth H was 10 nm or below, substantially the same values as in head slider 20 of the first embodiment were obtained. However, when step depth H was made greater than that, head slider 205 of the present embodiment tended to produce greater variations of the flying height. Thus, it was found also in the case of head slider 203 of the present embodiment that step depth H is preferably 100 nm or below, or more preferably, 60 nm or below because variations of the flying height hardly occur even if there are present some variations in working accuracy of step depth H and hence improved yields are advantageously obtained.

Figure 13:
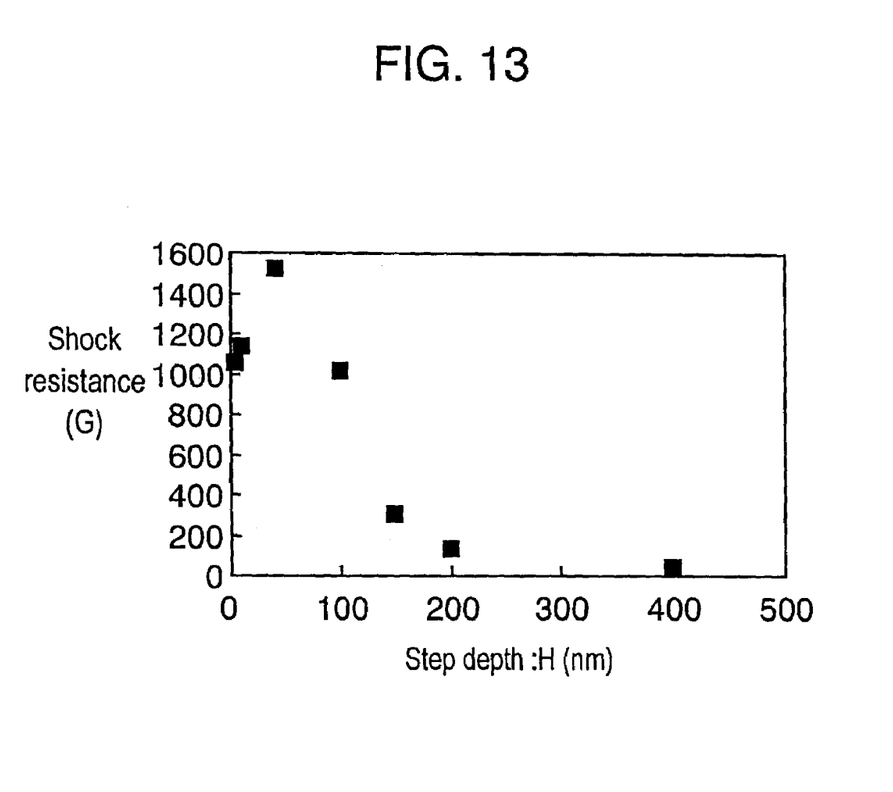
FIG. 13 is a graph showing a relationship between shock resistance and step depth at the stepped portion of the head slider of the third embodiment.

FIG. 13 shows a relationship between step depth H at stepped portion 38 and shock resistance. Analysis of the shock resistance was also made under the same conditions as applied to head slider 20 of the first embodiment. As seen from FIG. 13, it was found that the shock resistance value can be increased to 1000 G or above if step depth H is below 100 nm and above 5 nm.

In the case of head slider 205 of the present embodiment as described above, it is found that variations of the flying height can be kept within acceptable limits and further that a shock resistance of 1000 G can be obtained by setting step depth H at stepped portion 38 to be above 5 nm and below 100 nm. Besides, it is found that the step depth H is preferably within a range of 5 nm to 60 nm in order that variations of the flying height hardly occur and the yield is improved even if there are present some variations in working accuracy of step depth H.

The head slider for which groove 322 can be provided in cross rail 261 is not limited to head slider 205 described in the present embodiment. Even if a groove is provided for head slider 201, 202 as a variation of the first embodiment shown in FIG. 7A and FIG. 7B or for head slider 203, 204 in the second embodiment, the same functions can be performed.

By the use of the head slider of the present invention as described above, it becomes unnecessary to increase the revolving speed of the disk even if a small diameter disk is used so that power consumption can be prevented from increasing. Further, since a positive pressure can also be generated at the upstream-side intermediate-level portion when a shock force is exerted on the disk in the direction that the head slider is brought close to the disk surface, a collision of the head slider with the disk can be minimized. Further, by providing a plurality of projected portions on the surface of the upstream-side intermediate-level portion, damage on the disk can be minimized even if the head slider comes into contact with the disk. Thus, it is possible to mount a small-sized, low power consuming, and highly reliable disk drive on portable equipment.

What is claimed is:

1. A head slider for use opposite a rotatable disk in a disk drive apparatus, comprising
   a disk-facing surface for facing the rotatable disk, and
   a head disposed on said disk-facing surface so as to face the rotatable disk for performing at least one of recording and reproduction,
   wherein said disk-facing surface has:
   an upstream edge portion disposed in a lateral direction of said disk-facing surface and adapted to be perpendicular to a rotation direction of the rotatable disk and so as to be a leading edge portion of said disk-facing surface with respect to the rotation direction of the rotatable disk;
   a downstream edge portion disposed in said lateral direction of said disk-facing surface and so as to be a trailing edge portion of said disk-facing surface with respect to the rotation direction of the rotatable disk;

a first positive-pressure generating section comprising a cross rail disposed a predetermined distance from said upstream edge portion and generally parallel to said upstream edge portion, and side rails connected with said cross rail at opposing end portions thereof and extended toward said downstream edge portion to terminate in downstream side rail ends;

an upstream-side intermediate-level surface extending from said upstream edge portion to said cross rail, said upstream-side intermediate-level surface being parallel to said disk-facing surface and having a height lower than said cross rail such that a stepped portion is formed between said cross rail and said upstream-side intermediate-level surface;

a second positive-pressure generating section projecting upwardly from said disk-facing surface and disposed adjacent said downstream edge portion at a center line with respect to said lateral direction of said disk-facing surface;

a negative-pressure generating section generally surrounded by said first positive-pressure generating section and said second positive-pressure generating section and being recessed relative to said first and second positive-pressure generating sections;

wherein between said downstream edge portion and each of said downstream side rail ends, said disk-facing surface is free of any positive-pressure generating section projecting upwardly from said disk-facing surface; and wherein said stepped portion has a step depth in a range of 5 nm to 100 nm.

2. The head slider according to claim 1, wherein said step depth is in a range of 10 nm to 60 nm.

3. The head slider according to claim 2, wherein said cross rail has a groove formed therein joined with said upstream-side intermediate-level surface and extending generally perpendicular to said upstream edge portion.

4. The head slider according to claim 2, wherein said disk-facing surface further includes a plurality of projected portions projecting upwardly from said upstream-side intermediate-level surface; and said cross rail has a height lower than said projected portions and higher than said upstream-side intermediate-level surface.

5. The head slider according to claim 1, wherein said cross rail has a groove formed therein joined with said upstream-side intermediate-level surface and extending generally perpendicular to said upstream edge portion.

6. The head slider according to claim 5, wherein said disk-facing surface further includes a plurality of projected portions projecting upwardly from said upstream-side intermediate-level surface; and said cross rail has a height lower than said projected portions and higher than said upstream-side intermediate-level surface.

7. The head slider according to claim 1, wherein said disk-facing surface further includes a plurality of projected portions projecting upwardly from said upstream-side intermediate-level surface; and said cross rail has a height lower than said projected portions and higher than said upstream-side intermediate-level surface.

8. The head slider according to claim 1, wherein said side rails extend generally perpendicular to said upstream edge portion.

9. A disk drive apparatus according to claim 1, wherein said cross rail and said two side rails are of equal height so as to define a continuous top surface.

10. A disk drive apparatus comprising:

a rotatable disk;

a driving mechanism arranged for rotating said rotatable disk in a disk rotation direction;

a head slider;

an actuator arm supporting said head slider; and a positioning mechanism coupled with said actuator arm and arranged to position said actuator arm so as to position said head slider at a predetermined track position of said rotatable disk;

wherein said head slider has a disk-facing surface arranged to face said rotatable disk, and a head disposed on said disk-facing surface so as to face the rotatable disk for performing at least one of recording and reproduction, wherein said disk-facing surface includes an upstream edge portion disposed in a lateral direction of said disk-facing surface, perpendicular to the rotation direction of said rotatable disk and so as to be a leading edge portion of said disk-facing surface with respect to the rotation direction of the rotatable disk, a downstream edge portion disposed in said lateral direction of said disk-facing surface and so as to be a trailing edge portion of said disk-facing surface with respect to the rotation direction of the rotatable disk;

a first positive-pressure generating section constituting a cross rail disposed a predetermined distance from said upstream edge portion and generally parallel to said upstream edge portion, and side rails connected with said cross rail at opposing end portions thereof and extended toward said downstream edge portion to terminate in downstream side rail ends;

an upstream-side intermediate-level surface extending from said upstream edge portion to said cross rail, said upstream-side intermediate-level surface being parallel to said disk-facing surface and having a height lower than said cross rail such that a stepped portion is formed between said cross rail and said upstream-side intermediate-level surface;

a second positive-pressure generating section projecting upwardly from said disk-facing surface and disposed adjacent said downstream edge portion at a center line with respect to said lateral direction of said disk-facing surface; and a negative-pressure generating section generally surrounded by said first positive-pressure generating section and said second positive-pressure generating section and being recessed relative to said first and second positive-pressure generating sections;

wherein between said downstream edge portion and each of said downstream side rail ends, said disk-facing surface is free of any positive-pressure generating section projecting upwardly from said disk-facing surface; and wherein said stepped portion has a step depth in a range of 5 nm to 100 nm.

11. A disk drive apparatus according to claim 10, wherein said step depth is in a range of 10 nm to 60 nm.

12. A disk drive apparatus according to claim 11, wherein said cross rail has a groove formed therein joined with said upstream-side intermediate-level surface and extending generally perpendicular to said upstream edge portion.

13. A disk drive apparatus according to claim 11, wherein said disk-facing surface further includes a plurality of projected portions projecting upwardly from said upstream-side intermediate-level surface; and
said cross rail has a height lower than said projected portions and higher than said upstream-side intermediate-level surface.

14. A disk drive apparatus according to claim 10, wherein said cross rail has a groove formed therein joined with said upstream-side intermediate-level surface and extending generally perpendicular to said upstream edge portion.

15. A disk drive apparatus according to claim 14, wherein said disk-facing surface further includes a plurality of projected portions projecting upwardly from said upstream-side intermediate-level surface; and
said cross rail has a height lower than said projected portions and higher than said upstream-side intermediate-level surface.

16. A disk drive apparatus according to claim 10, wherein said disk-facing surface further includes a plurality of projected portions projecting upwardly from said upstream-side intermediate-level surface; and
said cross rail has a height lower than said projected portions and higher than said upstream-side intermediate-level surface.

17. A disk drive apparatus according to claim 10, wherein said side rails extend generally perpendicular to said upstream edge portion.

18. A disk drive apparatus according to claim 10, wherein said cross rail and said two side rails are of equal height so as to define a continuous top surface.

* * * * *